US008506709B2

(12) United States Patent
Ryabova

(10) Patent No.: US 8,506,709 B2
(45) Date of Patent: Aug. 13, 2013

(54) ROLL COATER HAVING A RECIRCULATION LOOP FOR TREATING EXCESS FLUID

(75) Inventor: Elmira Ryabova, Mountainview, CA (US)

(73) Assignee: Advenira Enterprises, Inc., Sunnyvale, CA (US)

( * ) Notice: Subject to any disclaimer, the term of this patent is extended or adjusted under 35 U.S.C. 154(b) by 160 days.

(21) Appl. No.: 13/078,607

(22) Filed: Apr. 1, 2011

(65) Prior Publication Data

US 2011/0244136 A1 Oct. 6, 2011

Related U.S. Application Data

(60) Provisional application No. 61/320,634, filed on Apr. 2, 2010.

(51) Int. Cl.

| | |
|---|---|
| ***B05C 3/02*** | (2006.01) |
| ***D21H 23/56*** | (2006.01) |
| ***B01J 19/10*** | (2006.01) |
| *B05D 1/28* | (2006.01) |

(52) U.S. Cl.

USPC ........... 118/612; 118/262; 118/602; 118/688; 427/428.15

(58) Field of Classification Search

USPC ................... 118/262, 602, 623, 70, 429, 612, 118/688; 427/428.15, 162

See application file for complete search history.

(56) References Cited

U.S. PATENT DOCUMENTS 3,051,125 A 8/1962 Ahara at al
3,356,062 A * 12/1967 Crowe .......................... 118/688
4,325,995 A 4/1982 Tamura et al.
4,357,370 A 11/1982 Alheid
4,379,724 A * 4/1983 Kashiwagi ........................ 134/1
4,393,778 A 7/1983 Kaneko
4,440,809 A 4/1984 Vreeland
4,489,670 A 12/1984 Mosser et al.
4,533,563 A 8/1985 Dahlgren et al.
4,643,124 A 2/1987 Switall
4,737,378 A 4/1988 Narita et al.
4,808,445 A 2/1989 Fujiwara et al.
4,871,593 A 10/1989 McIntyre
4,921,729 A 5/1990 Kaneko et al.
4,949,667 A * 8/1990 Yoshida et al. ................. 118/60
4,966,812 A * 10/1990 Ashley et al. ................. 428/412
5,010,840 A 4/1991 Busker et al.
5,015,500 A 5/1991 Garde
5,028,457 A 7/1991 Kinose et al.
5,048,453 A 9/1991 Eriksson
5,178,912 A 1/1993 Piacente et al.

(Continued)

FOREIGN PATENT DOCUMENTS

EP 2062729 A1 5/2009
EP 2062729 A1 5/2009

*Primary Examiner* — Dah-Wei Yuan
*Assistant Examiner* — Karl Kurple
(74) *Attorney, Agent, or Firm* — Kwan & Olynick LLP

(57) ABSTRACT

A roll coater with a recirculation loop is disclosed. Waste coating material form the roll coater is treated in an agitator unit containing, for example, one or more ultrasonic transducers, and optionally a filtration unit and/or temperature control unit to produce reconditioned coating solution, such as a reconditioned sol-gel precursor solution. Also disclosed is preventative maintenance module comprising a cleaning unit that is designed to engage and clean the applicator and/or metering rolls in a roll coater.

17 Claims, 7 Drawing Sheets

(56) References Cited

U.S. PATENT DOCUMENTS

| | | | | | |
|---|---|---|---|---|---|
| 5,262,193 | A * | 11/1993 | Louks et al. | 427/8 |
| 5,284,625 | A * | 2/1994 | Isayev et al. | 422/128 |
| 5,310,573 | A | 5/1994 | Tanokuchi et al. | |
| 5,376,402 | A * | 12/1994 | Louks et al. | 427/8 |
| 5,460,859 | A * | 10/1995 | Reale | 427/560 |
| 5,510,141 | A | 4/1996 | Makita et al. | |
| 5,514,214 | A | 5/1996 | Joel et al. | |
| 5,575,211 | A | 11/1996 | Harrison | |
| 5,618,628 | A * | 4/1997 | Volpe | 428/450 |
| 5,628,827 | A | 5/1997 | McCollam et al. | |
| 5,631,048 | A | 5/1997 | Kinose et al. | |
| 5,632,815 | A | 5/1997 | Damrau et al. | |
| 5,720,816 | A | 2/1998 | Li et al. | |
| 5,755,883 | A | 5/1998 | Kinose et al. | |
| 5,863,620 | A * | 1/1999 | Schafer | 427/508 |
| 5,955,035 | A * | 9/1999 | Dinzburg et al. | 422/128 |
| 5,970,272 | A * | 10/1999 | Kobayashi et al. | 399/1 |
| 6,037,020 | A | 3/2000 | Garlough et al. | |
| 6,136,374 | A | 10/2000 | Reuscher | |
| 6,344,087 | B2 * | 2/2002 | Hein | 118/262 |
| 6,521,290 | B1 * | 2/2003 | Kudo et al. | 427/214 |
| 6,554,003 | B1 * | 4/2003 | Birang et al. | 134/1.3 |
| 6,635,735 | B1 * | 10/2003 | Zhang et al. | 528/14 |
| 7,204,883 | B2 * | 4/2007 | Rizzoli et al. | 118/262 |
| 7,712,353 | B2 * | 5/2010 | Janssen et al. | 73/61.73 |
| 7,713,955 | B2 * | 5/2010 | Whiteford et al. | 514/183 |
| 8,206,024 | B2 * | 6/2012 | Wenzel et al. | 366/118 |
| 8,329,263 | B2 * | 12/2012 | Chen et al. | 427/600 |
| 2003/0087748 | A1 * | 5/2003 | Otsuki et al. | 501/88 |
| 2003/0122122 | A1 | 7/2003 | Iwata | |
| 2003/0224122 | A1 | 12/2003 | Lopez | |
| 2003/0234173 | A1 * | 12/2003 | Minter | 204/157.42 |
| 2004/0202793 | A1 | 10/2004 | Harper et al. | |
| 2004/0216664 | A1 | 11/2004 | Daggett et al. | |
| 2004/0255848 | A1 | 12/2004 | Yudasaka | |
| 2005/0026077 | A1 * | 2/2005 | Gronbeck et al. | 430/270.1 |
| 2006/0182882 | A1 | 8/2006 | Takahashi et al. | |
| 2007/0104873 | A1 | 5/2007 | Damrau | |
| 2007/0166872 | A1 | 7/2007 | Prene et al. | |
| 2008/0029977 | A1 | 2/2008 | Cheng et al. | |
| 2008/0171140 | A1 | 7/2008 | Hirmer et al. | |
| 2009/0050054 | A1 * | 2/2009 | Oldorff et al. | 118/200 |
| 2009/0101068 | A1 | 4/2009 | Boyd et al. | |
| 2009/0224066 | A1 * | 9/2009 | Riemer | 239/102.2 |
| 2010/0062155 | A1 | 3/2010 | Tajima | |
| 2010/0229417 | A1 | 9/2010 | Ogawa et al. | |
| 2010/0269901 | A1 * | 10/2010 | Sharma | 136/256 |
| 2011/0073174 | A1 * | 3/2011 | Varaprasad | 136/256 |

* cited by examiner

ROLL COATER HAVING A RECIRCULATION LOOP FOR TREATING EXCESS FLUID

This application claims the benefit under 35 U.S.C. §119 (e) to U.S. Provisional Application Ser. No. 61/320,634, filed Apr. 2, 2010 and is expressly incorporated herein.

FIELD OF THE INVENTION

Disclosed are methods and roll coater systems for depositing nanocomposite films and coatings on a plurality of substrates including but not limited to glass, metal, plastic sheets or foils.

BACKGROUND OF THE INVENTION

Binary and ternary metal-nonmetal compounds of various compositions are widely used as thin films for a variety of purposes. For example, binary and ternary metal-nonmetal compounds, including but not limited to $Y_2O_3$, $ZrO_2$, YZO, $HfO_2$, YHO, $Al_2O_3$, $AlO_2$, ZnO, AZO, ITO, SiC, $Si_3N_4$, $Si_x$-CyNz, $Si_x$OyNz, $TiO_2$, CdS, ZnS, $Zn_2SnO_4$, $SiO_2$, $WO_3$, $CeO_3$ and so on, have been deposited as thin film coatings or layers of multilayer film stacks serving to various purposes, such as transparent conductive oxide (TCO) electrodes, passivating films, back surface field layers, up- and down-converters, selective emitter masks, ion storage, solid electrolytes, moisture barriers, abrasion resistance layers, thermal barriers, impedance correction layers, surface modification and the like.

Many methods are known that provide for the deposition of these materials. Those methods can be divided into two categories: vacuum techniques such as PVD, CVD, ALD, MBE etc., and non-vacuum ones such as electroplating, CBD, screen printing, etc. The vacuum techniques have high capital expenses, cost of operation and cost of consumables. The non-vacuum techniques have high capital expense and waste treatment costs and are very limited in many ways.

The use of sol-gels provides an alternative to the foregoing. Sol-gel precursors have the unique ability to undergo polymerization to form ultrapure continuous films with exact stoichiometry and doping thereby providing means for microstructure and interface engineering. Currently sol-gels are used mainly for the small scale applications such as optical lenses or biomedical devices such as implants and vascular stents. Sol-gel precursor solutions are typically applied to the lens or biomedical device by dip, spin or spray coating. Roll coaters have not been used successfully in the deposition of large scale sol-gel based thin films because of the difficulties in forming and maintaining a dynamic wetting line using non-Newtonian fluids.

There are many roll coater designs know in the art. However, in large part, such designs do not enable the industrial deposition of many critical thin films using sol-gel precursors.

Accordingly, there is a need for systems and methods that can provide aforementioned binary, ternary and other compounds as a single layer or multilayer film stack member on large size flat substrates, both rigid and flexible without compromising the nanocomposite films' purity, stoichiometry, morphology and thickness uniformity.

There is an additional need to provide roll coaters that can efficiently use sol-gel precursors with minimal loss of material.

There is also a need for a means to provide preventative maintenance of roll coater components, such as applicator rolls used with sol-gel precursor solutions.

SUMMARY OF THE INVENTION

The disclosure is directed to methods and systems that substantially obviate one or more of the above and other problems associated with conventional methods for thin film deposition using roll coaters that are designed to employ sol-gel precursors and in particular non-Newtonian sol-gel precursors.

In one aspect the roll coater comprises:

(1) a metering roll and an application roll where the rotational axis of the rolls are parallel to each other and positioned to create a gap between the metering roll and application roll;

(2) a reservoir in fluid communication with the gap between the metering and application roll;

(3) a receptacle positioned to receive waste fluid generated during operation of the roll coater;

(4) a conduit for transport of waste fluid from said receptacle; and (5) one or more ultrasonic transducers positioned to impart ultrasonic energy into the waste fluid.

In some cases, the waste fluid is converted by the transducers and an optional filtration unit and temperature control unit into a reconditioned coating solution, e.g. a reconditioned sol-gel precursor solution, which is substantially free of particulate matter and capable of being reused in the roll coater or other applications.

In yet another embodiment, the roll coater contains a preventative maintenance unit comprising a cleaning unit that reversibly engages the applicator and/or metering roll. The engagement surface of the cleaning unit has a shape that allows it to engage the surface of the applicator or metering roll. That surface preferably conforms to the inside of an angular portion of a cylinder that has an inside diameter that is the same or slightly larger than the outside diameter of the applicator or metering role. The engagement surface has one or more rinsing ports that are connected by a conduit to a solvent source and at least one suction port connected to a low pressure source to remove solvent and debris from the surface of the applicator roll. Brushes such s stationary and rotary brushes can also be used to facilitate removal of debris from the roll surface.

In another aspect, the roll coating chamber is a closed or semi-closed system wherein the roll coater environment, including temperature, exposure to outside contaminants and nature of the gases within the chamber are controlled. The roll coating chamber can be completely enclosed when the substrate can be contained within the coating chamber such as in a reel to reel application. When however, solid substrates larger than the coating chamber are used, provision must be made to provide for the entry and exit of the substrate into and out of the chamber. Entry and exit ports which are slightly larger than the cross section of the substrate can be used preferably in combination with a positive pressure within the coating chamber to minimize contamination from the outside.

The recirculation loop is also preferably a closed system wherein the temperature, pressure, filtration and laminar flow of the waste coating solution can be adjusted and/or maintained.

In a preferred embodiment, both the environment of the roll coating chamber and recirculation loop are controlled so as to maximize the use of coating solution and minimize the formation of defects within the deposited thin films.

DETAILED DESCRIPTION

There are several disclosed embodiments that can be used separately or in combination with of the other embodiments. The first embodiment is sometimes referred to as a roll coater with a recirculation loop. Waste coating material form the roll coater is treated in an agitator unit containing, for example, one or more ultrasonic transducers, and optionally a filtration unit and/or temperature control unit to produce reconditioned coating solution, such as a reconditioned sol-gel precursor solution, that is substantially free of polymerization nuclei and particulate matter and which can be returned to the reservoir for reuse in the roll coater.

The second embodiment is a roll coater with a cleaning unit that is designed to clean the applicator roll and/or metering roll (if used) in a roll coater.

I. Roll Coater System

Figure 1:
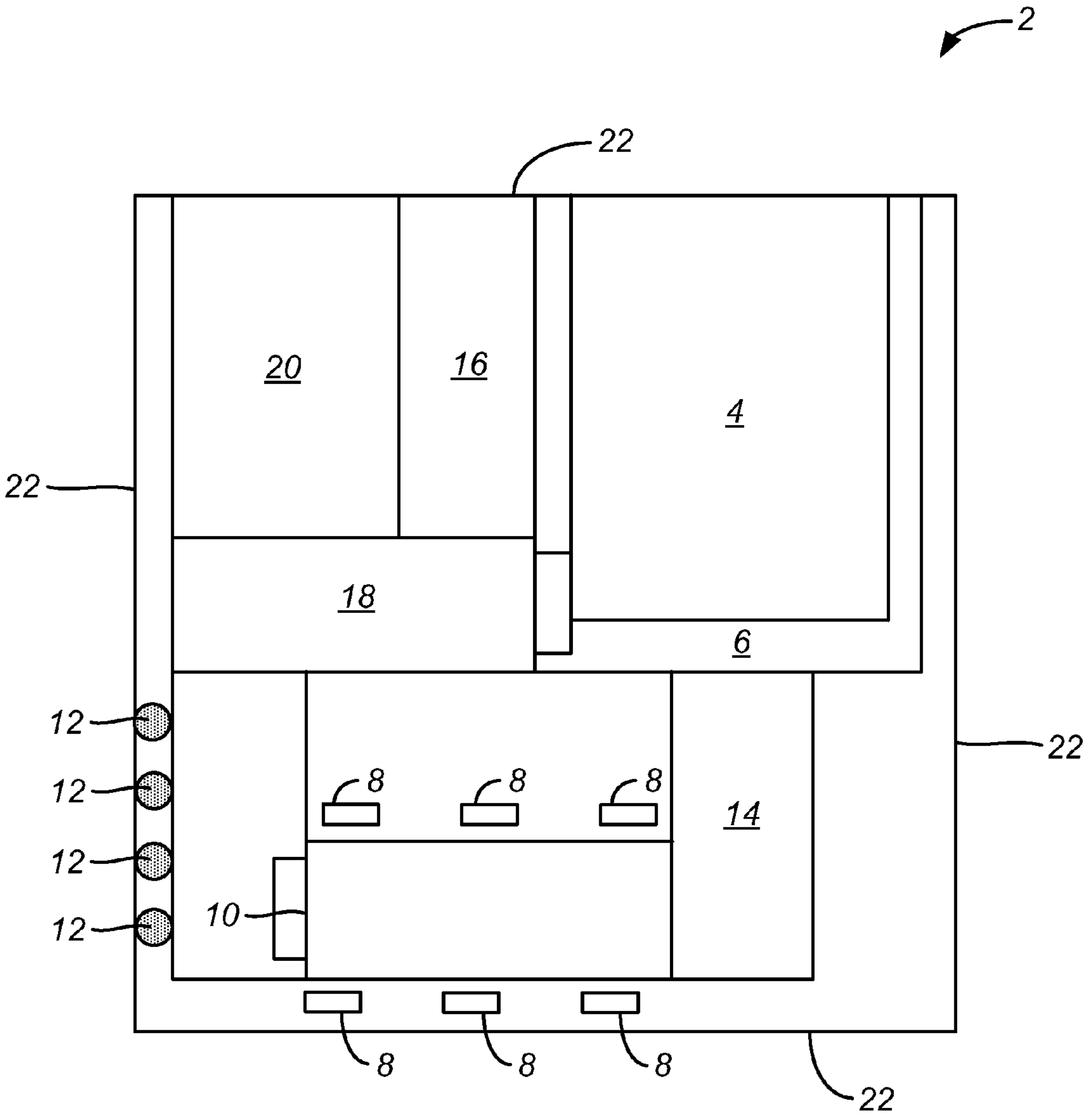
FIG. 1 is a schematic of a fully enclosed roll coating system containing among other components a roll coating chamber with a thermo stabilization jacket, a recirculation loop with agitators, a filtration device and a temperature control zone and a preventative maintenance device.

FIG. 1 is a schematic of a fully enclosed roll coater system 2. The system includes coating chamber 4, thermo stabilization jacket 6, agitation devices 8, filtration device 10 and heat exchangers 12. The relationship of these devices to each other, some or all of which make up the recirculation loop, will be explained infra.

In addition, the system can include a module 14 positioned downstream from the coating chamber which can, for example be used to further process substrate coated with a thin film. Such processes include heat treatment and/or exposure to UV and/or IR radiation to initiate or further polymerization and drying of the thin film.

Another optional component of the system includes a preventative maintenance (PM) unit 16. This unit is designed to engage the applicator and/or metering in the coating chamber 4 to remove debris and other matter that builds up during operation and which can result if not removed in the formation of defects in the thin film. It will be discussed in more detail infra.

Other components of the system can include mixing chamber 18 and dosing chamber 20 where coating solutions can be prepared and metered to the roll coat, respectively.

The entire system is enclosed by walls 22 as well as bottom and top walls (not shown). Appropriate access ports (not shown) are positioned to allow access for operation and maintenance.

I. Roll Coater Recirculation Loop

Some coating solutions, such as sol-gel precursor solutions and, in particular, non-Newtonian sol-gel precursor solutions (e.g. dilatant solutions), commence polymerization as a result of being manipulated during the roll coating process. The waste fluid from the roll coater can therefore contain sol-gel precursors, polymerization nuclei and in some cases particulate matter. Such waste fluids are not useful in highly critical applications where defects need to be avoided and stoichiometry maintained. To avoid discarding such waste fluids, the disclosed roll coater utilizes electromagnetic transducers such as ultrasonic transducers to impart ultrasonic energy into the waste fluid to reverse the polymerization reactions. A filter can optionally be employed in the waste fluid stream downstream from the transducer assembly to remove any residual particulate material. In addition, a temperature control unit can optionally be positioned downstream from the transducers to lower the temperature of the fluid stream so as to prevent the onset of any additional polymerization. In essence, the waste fluid is converted to a reconditioned sol-gel precursor stream that can be reused by the roll coater in the same process via a recirculation loop. Alternatively, the reconditioned sol-gel precursors can be used in other applications.

Figure 2:
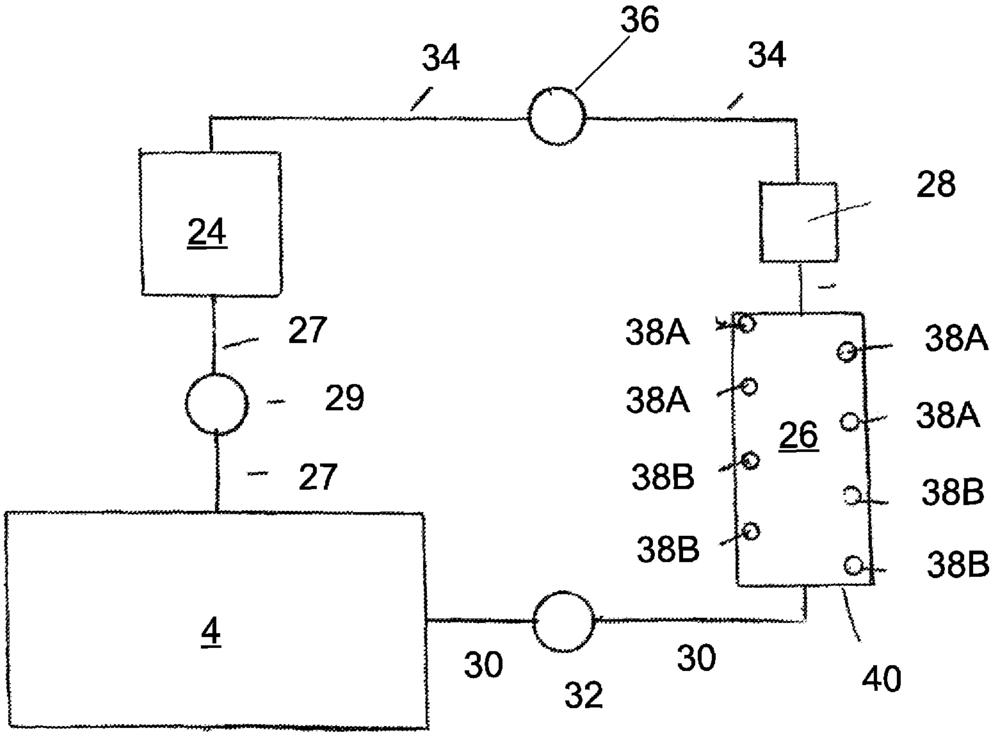
FIG. 2 is a schematic of a roll coater, according to one of the disclosed embodiments, which utilizes a recirculation loop and ultrasonic transducers to treat waste sol-gel liquids.

FIG. 2 is a schematic of a roll coater according to one of the embodiments that utilizes a recirculation loop and ultrasonic transducers to treat waste sol-gel liquids. There are four main components: coating chamber 4, reservoir 24, agitation chamber 26, and an optional temperature control unit 28. Reservoir 24 is fluidly connected to coating chamber 4 via conduits 27 and peristaltic pump 29. Coating chamber 4 is fluidly connected to agitation chamber 26 via conduits 30 and peristaltic pump 32. Likewise, agitation device 26 is fluidly connected to optional temperature control device 28 and reservoir 24 via conduits 34 and peristaltic pump 36. The conduits are preferably made from or coated with Teflon™ or other plastic which provides a smooth interior surface in the conduit so as to minimize turbulent flow. Peristaltic pumps are also used to minimize turbulence.

Agitation device 26 contains a plurality of agitation devices 38 supported by frame 40. In the preferred embodiments the agitators are transducers that convert electrical energy to pressure energy. Examples of such transducers include ultrasonic transducers that operate between about 20 KHz and about 200 MHz, more preferably between about 2 mega Hz and about 200 mega Hz. However, frequencies lower than 20 KHz can also be used. Accordingly, the range of frequency can be as low as any one of 1 Hz, 10 Hz, 100 Hz, 1 KHz, 10 KHz or 20 KHz and as high as any one of 100 KHz, 200 KHz, 500 KHz, 1 MHz, 10 MHz, 100 MHz and 200 MHz. Transducers can be obtained from any number of suppliers including Olympus (http://www.olympus-ims.com/en/probes/), Omega (http://www.omega.com) and UPCORP (http://www.upcorp.com).

The penetration of the transduced energy into the waste fluid will depend on the choice of frequency as well as the power produced by the transducer. The choice of frequency and power will depend on the physical dimensions of the conduit, including inside diameter, conduit wall thickness and composition as well as the viscosity and velocity of the waste coating solution in the conduit. In order to impart energy on the waste solution, in many cases two or more and as many as six or eight different frequencies may be needed to penetrate the entire volume of waste coating solution passing through agitation device 26. The transducers can be in direct contact with the surface of the conduit or positioned within several millimeters of the conduit's surface.

Accordingly, in some embodiments two or more transducers, e.g. ultrasonic transducers, are operated at a first frequency and are positioned to produce phase interference, e.g. ultrasonic phase interference in the waste fluid. In other embodiments, two or more additional ultrasonic transducers are used. The additional transducers operate at a different second frequency and are positioned to produce phase interference such as ultrasonic phase interference in the waste fluid.

In operation, a coating solution such as a sol-gel precursor solution is placed in reservoir 24. Peristaltic pump 28 then transfers the coating solution to coating chamber 4, whose function will be described in more detail hereinafter. Waste solution generated in coating chamber 4 is removed via conduit 30 and peristaltic pump 32 and transferred to agitation device 26. The ultrasonic transducers 38 in agitator device 8 impart ultrasonic energy to the waste fluid carried from conduit 30. This energy reverses polymerization induced during the coating process. The thus treated fluid is then transferred to optional temperature control unit 28 and via peristaltic pump 36 and conduits 34 to reservoir 24 in one embodiment.

The temperature control unit 28 is optional but is preferably present to control the temperature of the effluent from agitation device 26, which when exposed to ultrasonic or other electromechanical energy causes the temperature of the effluent to increase. Temperature control unit 28 preferably reduces the temperature so that the effluent returning to reservoir 24 is at or near the same temperature as the coating solution present in the reservoir.

A filter device (not shown) may also be used to remove particulate matter. The filter can be positioned between the agitation device 26 and temperature control unit 28, between temperature control devise 28 and reservoir 24 or at both positions.

Transducers 38 can operate at the same or different frequencies. For example, transducers 38A can be operated at a frequency of between 1 Hz-100 KHz, more preferably between 10 Hz and 100 KHz, and most preferably between 100 Hz and 100 KHz. Ultrasonic transducers 24B, on the other hand, can operate at a different frequency such as between 1 and 500 Hz, more preferably 10-500 Hz, and most preferably between 100 and 500 Hz. Although two different frequencies are demonstrated in FIG. 2, it should be appreciated that a multiplicity of different frequencies can be used in this embodiment.

In an alternate embodiment, the effluent from agitation device 28 and optional temperature control units 28 and particulate filtration device(s) can be diverted from the recirculation loop connecting coating chamber 4 and reservoir 24 and collected in a receptacle other than reservoir 24. When separately isolated, such reconditioned coating solutions can be used for the same or different applications.

Figure 3:
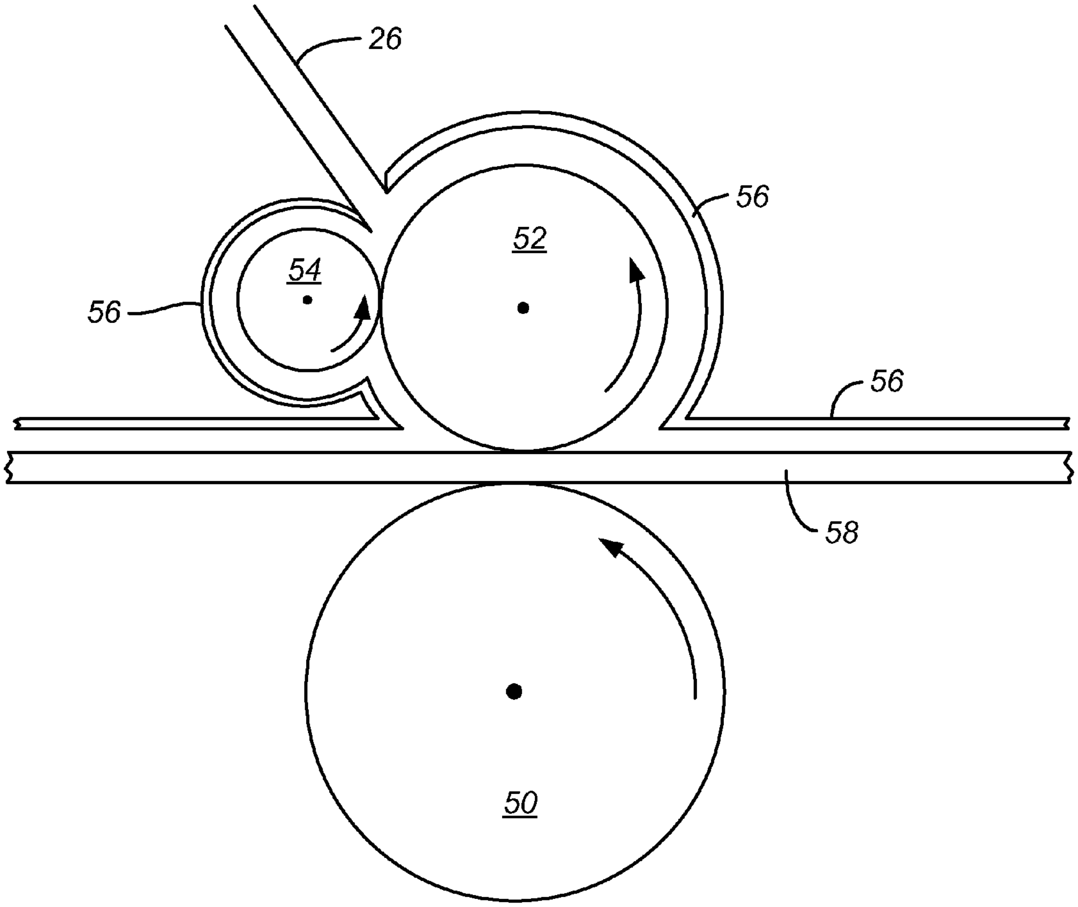
FIG. 3 is a schematic showing the working components of the coating chamber in FIG. 2.

FIG. 3 is a schematic showing the working components of coating chamber 4 in FIG. 1 and FIG. 2. The working components consist of drive roll 50, applicator roll 52, metering roll 54, outer wall 56 of coating chamber 4, conduit 26, and substrate 58, when present. In practice, drive roll 50 rotates in a counterclockwise direction as shown to urge substrate 58 to the left. Applicator roll 52 and metering roll 54 also rotate in a counterclockwise direction to thereby operate as a reverse roll coater. Coating fluid (not shown) travels through conduit 26 from reservoir 24 via peristaltic pump 28. The coating fluid is deposited between applicator roll 52 and metering roll 54. The width of the gap G between applicator roll 52 and metering roll 54 (not shown), together with the sheer tensor ($\tau_{i,j}$), rotational speed (V) and capillary number (Ca), determine the approximate film thickness (H) deposited on the application roll which is proportional to the thickness of the layer deposited on substrate 58. H is approximately equal to $\tau_{i,j}\times G\times Ca\times V$. The film thickness on the applicator roll (H) determines the thickness of the film deposited on substrate 58.

Although shown to operate as a reverse roll coater in FIG. 3, the direction of rotation of applicator roll 52 or metering roll 54 can be reversed to constitute a forward roll coater application.

Figure 4:
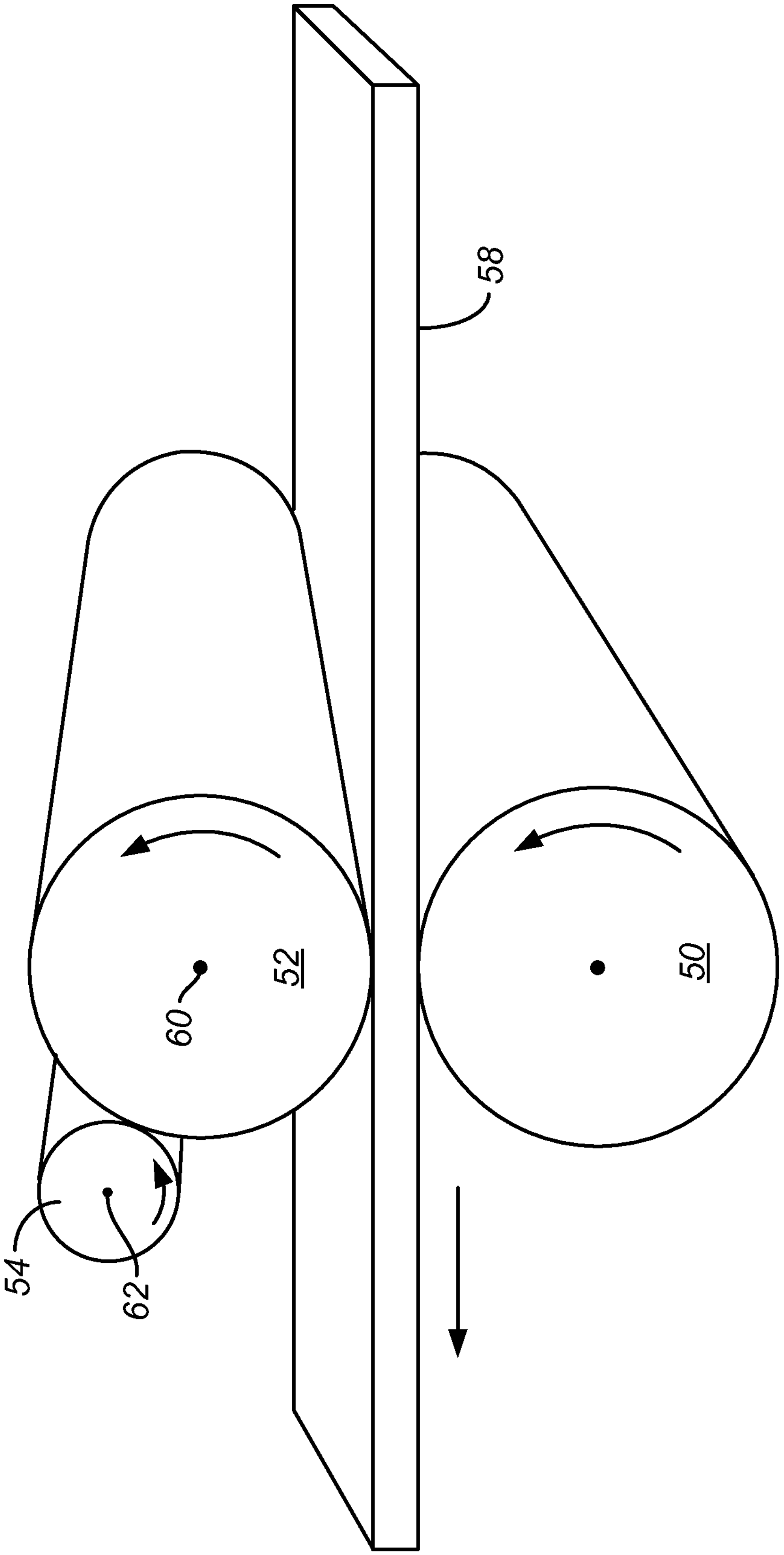
FIG. 4 is a three-dimensional view of the moving components of an alternate embodiment of a roll coating chamber where the outer wall of the coating chamber has been removed for clarity.

FIG. 4 is a three-dimensional view of the moving components within the roll coating chamber. In FIG. 4 the outer wall of the coating chamber has been removed for clarity. Drive roll 50 is positioned below substrate 58 and acts to move substrate 58 in the direction shown. Also shown is applicator roll 52 and metering roll 54. The applicator roll rotates about longitudinal axis 60. The metering roll rotates about longitudinal axis 62.

Figure 5:
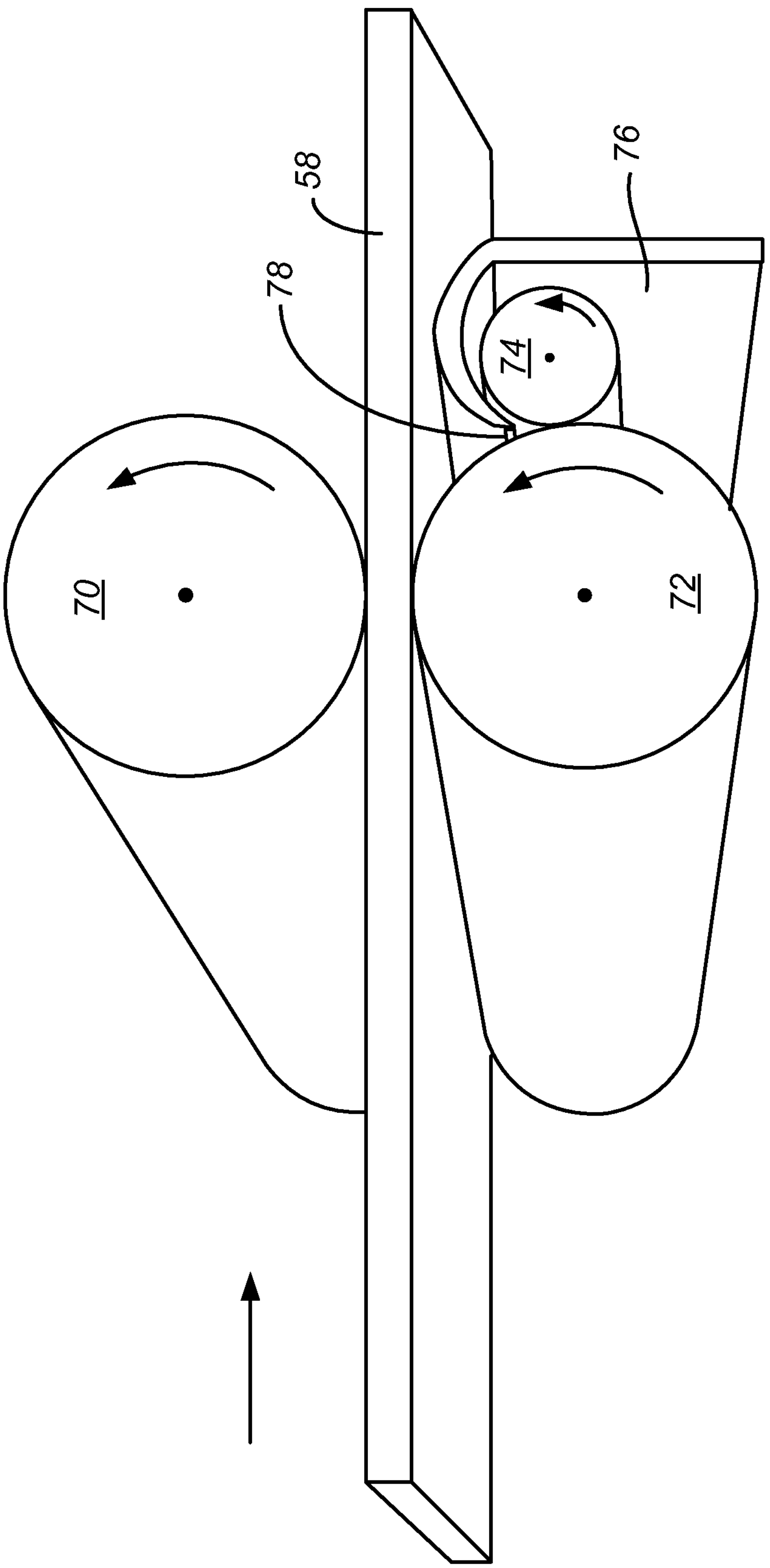
FIG. 5 depicts an alternate embodiment of that set forth in FIG. 4, wherein a thin layer is applied to the bottom side of the substrate.

FIG. 5 depicts an alternate embodiment of that set forth in FIG. 4, wherein a thin layer of coating material is applied to the bottom side of substrate 58. As indicated, drive roller 70 is positioned above substrate 58 and engages substrate 58 to move it in the direction shown. Applicator roll 72 and metering roll 74 are positioned below substrate 38 and applicator roller 72 is positioned to engage the lower surface of substrate 58 so as to apply a thin film of coating material. As with FIG. 4, a gap exists between applicator roll 72 and metering roll 74. Manifold 76 has a hollow interior, which is in fluid communication with reservoir 24. This manifold curves over metering roll 74 and terminates in orifice 78, which provides for the loading of a coating solution at the interface between applicator roller 72 and metering roll 74.

When coating solution is placed between the applicator roll and metering roll in FIGS. 4 and 5 it fills a gap between the rolls (not shown) and during operation the applicator role applies a thin film of the coating to the surface of substrate 58. However, the coating solution also flows to the edge of the rollers and then via gravity into a waste receptacle that is part of the recirculation loop.

III. Roll Coater with Preventative Maintenance Module

Figure 6:
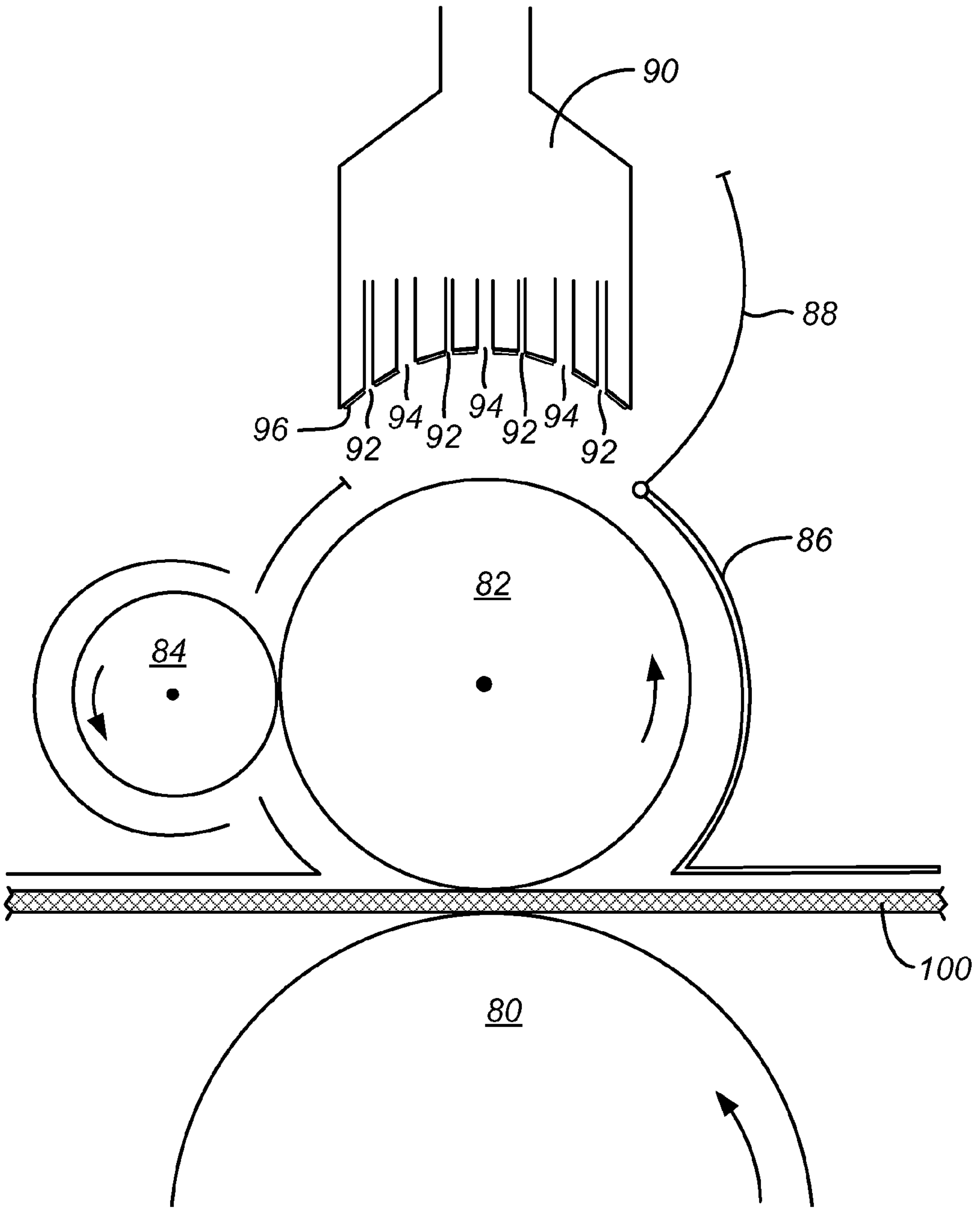
FIG. 6 shows an additional embodiment that includes a preventative maintenance module.

FIG. 6 shows an additional embodiment that includes a preventative maintenance module. The preventative maintenance module is needed in many embodiments, due to the fact that various coating solutions can sometimes precipitate and/or polymerize into particles that can contaminate the surface of applicator roll 82, and/or metering roll 84. The defects created on the surface of these rollers can have profound impact on the actual thin layer deposited on a substrate. Accordingly, periodic maintenance is necessary to treat the surfaces of primarily applicator roll 82 to facilitate the deposition of uniform and substantially defect-free thin films on substrate 38. To this end, the outer wall 86 of coating chamber 4 a chamber lid 88 which reversibly opens and closes to expose a portion of applicator roll 82 to cleaning unit 90. Cleaning unit 90 is shown in cross-section in FIG. 6 and is capable of translating (downward and upward as shown in this embodiment) so as to engage and disengage in this case the top of applicator roll 82. Cleaning unit 90 has an engagement surface that has dimensions that match the surface of application roll 82. Cleaning unit 90 contains plurality of rinse holes 92 and a plurality of section holes 94 located on the engagement surface. The rinsing and suction holes preferably alternate as shown in FIG. 6. In some embodiments, a plurality of stationary brushes 96 are positioned on the engagement surface of the cleaning unit 90 and positioned between the rinsing holes 92 and suction holes 94. Such brushes are made from plastic, preferably polytetratfluoroethylene (PTFE).

In practice, when applicator roll 82 requires preventative maintenance, chamber lid 88 is opened and cleaning unit 90 is translated to make contact with applicator roll 82. Prior to this engagement, dummy substrate 100 is inserted between drive roller 80 and applicator roll 82. Prior to or commencing with engagement of the rotation of the rollers, a solvent is forced through the rinsing holes 92 while rotation of the drive, applicator and metering rolls and translation of the dummy substrate proceeds. A negative pressure can be applied to the suction holes 94 either continuously or intermittently to remove solvent applied through the rinsing holes and any material removed from the surface of applicator roll 82 or metering roll 84. In the preferred embodiments, the preferred solvent used for carrying out preventative maintenance is the same solvent used in the coating solution used during the manufacture of thin film layers.

After maintenance, the cleaning unit 90 is removed, the chamber lid 88 is closed and dummy substrate 90 is removed.

In most embodiments, there are a multiplicity of rinsing ports and suction ports that preferably alternate on the engagement surface. When viewed in cross-section in the body of the cleaning unit, such ports can be circular in cross section or elongate having a rectangular or other elongate cross section. At the surface of the cleaning unit, the surfaces of the rinsing and suction ports will be modified so as to have the proper shape to engage the curvature of the applicator roll. When engaged with the applicator role surface, elongate ports can extend over the entire length of the engagement surface i.e. parallel to the rotational axis of the applicator role. When engaged, the entire surface of a portion of the applicator roll is rinsed with solvent from a single elongate port. As the applicator role rotates around its axis, additional portions of the surface are rinsed with solvent. During rotation, the brushes 96 help to disengage particulate matter.

Figure 7:
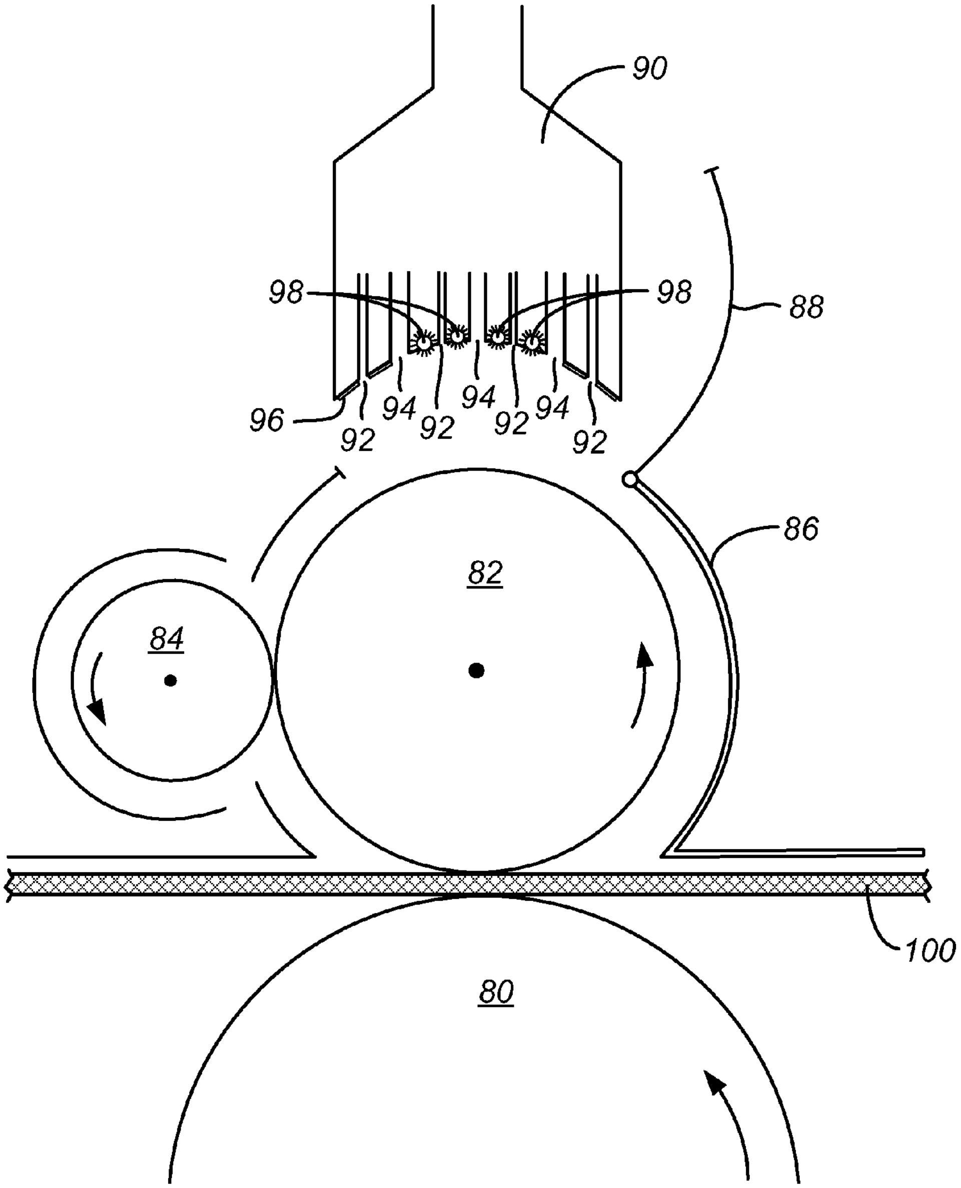
FIG. 7 shows an alternate embodiment of the preventative maintenance unit as set forth in FIG. 6.

FIG. 7 shows an alternate embodiment of the preventative maintenance module of FIG. 6. In this embodiment, the engagement surface of the cleaning unit preferably contains a plurality of rotational brushes 98, positioned between the rinsing and suction ports, which directly engage the surface of the applicator roll. These brushes are preferably electromechanical brushes. Such electromechanical brushes can be elongate brushes which have a rotational axis parallel to the rotational axis of the applicator roll. The brushes can be rotated in the same or opposite direction of the applicator roll rotation during engagement of the cleaning unit. When rotated in the same direction the brushes and applicator roll operate in a manner similar to a reverse roll coater thereby creating an abrasive environment at the surface of the applicator roll. When rotated in opposite directions, it is preferred that the brushes rotate at a speed that produces an abrasive environment at the applicator roll surface i.e. the linear velocity of the rotating applicator and brush rolls are different. Such brushes are preferably made from PTFE. In some embodiments, the brushes are movable which allows for the adjustment of the pressure applied by the brush on the surface of the roll.

In some embodiments an electrostatic charge can be applied to the brushes to attract debris of opposite charge. In such embodiments it is preferred that more than one brush is used where a positive or negative charge is applied to one brush while the opposite charge is applied to the other. In this embodiment the brushes are preferably made from electrically conductive composite PTFE.

Although the above description is directed to a preventative maintenance module designed to clean an applicator roll, such modules can be readily modified to engage other roll such as the metering and drive rolls.

In some embodiments, it is preferred that metering and applicator rolls be cleaned at the same time to prevent contaminating one roll with of debris of the other roll as it is being cleaned.

What is claimed is:

1. A roll coater comprising:

a metering roll;

an applicator roll, wherein a rotational axis of the metering roll and a rotational axis of the applicator roll are parallel and are positioned to create a gap between said metering roll and said applicator roll;

a reservoir in fluid communication with said gap;

a receptacle positioned to receive an excess fluid generated during operation of said roll coater; and a recirculation loop for receiving the excess fluid from the receptacle, for treating the excess fluid, and delivering a treated fluid into the reservoir, the recirculation loop comprising an agitation device, the agitation device comprising two or more ultrasonic transducers configured to operate at one or more frequencies selected based on a viscosity and a velocity of the excess fluid flowing through the agitation device, wherein the two or more ultrasonic transducers, operating at the one or more selected frequencies, are configured to produce one or more phase interferences in the excess fluid flowing through the agitation device thereby reversing polymerization of a sol-gel precursor within the excess fluid and reducing viscosity of the excess fluid while the excess fluid is flowing through the agitation device.

2. The roll coater of claim 1, wherein said one or more transducers are positioned along a conduit in fluid communication with said receptacle and said reservoir, the conduit being a part of the agitation device.

3. The roller coater of claim 1, wherein at least two of the one or more transducers are configured to operate at a first frequency and at least two additional transducers of the one or more transducers are configured to operate at a second frequency that is different from the first frequency, and wherein the at least two additional transducers are configured to produce phase interference in said excess fluid.

4. The roll coater of claim 1, wherein said one or more ultrasonic transducers are configured to operate at a frequency of between 1 Hz and 500 Hz.

5. A roll coater system comprising a chamber containing the roll coater of claim 1.

6. The roll coater of claim 1, wherein the recirculation loop comprises one or more peristaltic pumps, the one or more peristaltic pumps are configured to minimize turbulence in the recirculation loop.

7. The roll coater of claim 1, wherein the agitation device comprises a conduit, the conduit having an internal surface made of polytetrafluoroethylene and configured to minimize turbulence in the conduit.

8. The roll coater of claim 1, wherein the excess fluid comprises a non-Newtonian sol-gel precursor solution.

9. The roll coater of claim 1, wherein the recirculation loop further comprises a temperature control unit configured to receive the treated fluid from the agitation device and configured to reduce a temperature of the treated fluid to a predetermined level thereby reducing additional polymerization of the sol-gel precursor in the treated fluid.

10. The roll coater of claim 1, wherein the one or more ultrasonic transducers are configured to operate at six or more different frequencies to penetrate energy through an entire volume of the excess fluid while the excess fluid is flowing through the agitation device.

11. The roll coater of claim 1, wherein the one or more transducers are configured to impart energy throughout an entire volume of the excess fluid.

12. The roll coater of claim 9, wherein the predetermined level is the same as a temperature of a fluid in the reservoir.

13. The roll coater of claim 1, wherein the one or more ultrasonic transducers comprises multiple ultrasonic transducers supported by a frame.

14. The roll coater of claim 1, wherein said one or more ultrasonic transducers are configured to operate at a frequency of between 100 Hz and 500 Hz.

15. The roll coater of claim 6, wherein the one or more peristaltic pumps are configured to maintain at least one of pressure or laminar flow of the excess fluid in the recirculation loop.

16. The roll coater of claim 6, wherein at least one of the one or more peristaltic pumps is disposed between the receptacle and the agitation device and configured to flow the excess fluid from the receptacle to the agitation device.

17. The roll coater of claim 16, wherein at least one of the one or more peristaltic pumps is disposed between the agitation device and the reservoir and configured to flow the excess fluid from the agitation device to the reservoir.

* * * * *

UNITED STATES PATENT AND TRADEMARK OFFICE

CERTIFICATE OF CORRECTION

PATENT NO. : 8,506,709 B2
APPLICATION NO. : 13/078607
DATED : August 13, 2013
INVENTOR(S) : Elmira Ryabova It is certified that error appears in the above-identified patent and that said Letters Patent is hereby corrected as shown below:

In the Claims

Col. 8, lines 30-34, Claim 2, should read:
2. The roll coater of claim 1, wherein said two ~~one~~ or more transducers are positioned along a conduit in fluid communication with said receptacle and said reservoir, the conduit being a part of the agitation device.

Col. 8, lines 35-41, Claim 3, should read:
3. The roller coater of claim 1, wherein at least two of the two ~~one~~ or more transducers are configured to operate at a first frequency and at least two additional transducers of the two ~~one~~ or more transducers are configured to operate at a second frequency that is different from the first frequency, and wherein the at least two additional transducers are configured to produce phase interference in said excess fluid.

Col. 8, lines 42-44, Claim 4, should read:
4. The roll coater of claim 1, wherein said two ~~one~~ or more ultrasonic transducers are configured to operate at a frequency of between 1 Hz and 500 Hz.

Col. 8, lines 63-67, Claim 10, should read:
10. The roll coater of claim 1, wherein the two ~~one~~ or more ultrasonic transducers are configured to operate at six or more different frequencies to penetrate energy through an entire volume of the excess fluid while the excess fluid is flowing through the agitation device.

Col. 9, lines 1-3, Claim 11, should read:
11. The roll coater of claim 1, wherein the two ~~one~~ or more transducers are configured to impart energy throughout an entire volume of the excess fluid.

Signed and Sealed this
Twelfth Day of November, 2013

Teresa Stanek Rea
*Deputy Director of the United States Patent and Trademark Office*

Col. 9, lines 5-8, Claim 13, should read:
13. The roll coater of claim 1, wherein the two ~~one~~ or more ultrasonic transducers comprises multiple ultrasonic transducers supported by a frame.

Col. 9, lines 9-11, Claim 14, should read:
14. The roll coater of claim 1, wherein said two ~~one~~ or more ultrasonic transducers are configured to operate at a frequency of between 100 Hz and 500 Hz.